United States Patent [19]

Clark et al.

[11] Patent Number: 4,517,679
[45] Date of Patent: May 14, 1985

[54] COMMUNICATION OVER NOISY LINES

[75] Inventors: Duncan G. D. Clark, Blackwater, Nr. Camberley; Ian D. Kimber, Bracknell; Roderick G. May, Wealdstone, all of England

[73] Assignee: EMI Limited, Hayes, England

[21] Appl. No.: 473,055

[22] Filed: Mar. 7, 1983

[30] Foreign Application Priority Data

Mar. 10, 1982 [GB] United Kingdom ............ 8207043

[51] Int. Cl.³ ............................................. H04K 1/04
[52] U.S. Cl. .............................................. 375/37; 375/1; 375/115
[58] Field of Search .............. 375/1, 115, 37, 76; 370/107; 343/5 PN; 340/347 DD

[56] References Cited

U.S. PATENT DOCUMENTS

| | | | |
|---|---|---|---|
| 3,878,527 | 4/1975 | Rensin et al. ............................ | 375/1 |
| 3,953,674 | 4/1976 | Fletcher et al. ...................... | 375/115 |
| 4,039,749 | 8/1977 | Gordy et al. .......................... | 375/115 |
| 4,351,064 | 9/1982 | Ewanus ................................... | 375/1 |
| 4,435,822 | 3/1984 | Spencer et al. ........................ | 375/1 |

Primary Examiner—Robert L. Griffin
Assistant Examiner—Stephen Chin
Attorney, Agent, or Firm—Fleit, Jacobson, Cohn & Price

[57] ABSTRACT

In a line network communication system coded data signals are transmitted on a base band carrier signal and are recovered in a receiver. The receiver includes an exclusive OR gate and a shift register which operate in conjunction to compare, during successive time intervals, a series of coded reference signals and a succession of received signals shifted in phase relative to one another by respective amounts to generate respective comparison signals forming a set. A control unit causes a change in the relative phases of compared signals until the value of a comparison signal in a set indicates a degree of correlation exceeding a threshold value. Then, in a tracking mode, the control unit monitors the values of comparison signals generated in successive sets to verify that a degree of correlation exceeding the threshold value persists. If the verification is successful the control unit, in a locking mode, adjusts the relative phases of the compared signals to maintain a desired degree of correlation.

7 Claims, 7 Drawing Figures

COMMUNICATION OVER NOISY LINES

BACKGROUND OF THE INVENTION

1. Field of the Invention

This invention relates to communication over noisy lines and more particularly, but not exclusively, to communication and telecontrol over the electricity mains network.

2. Description of Prior Art

A line network communications system commonly encounters interference problems arising from a variety of sources. Severe interference may result in data loss during transmission, necessitating repeat commands or ultimately, periods of communication breakdown. Occurrences of this nature may hinder the operation of an effective communications system.

In a communication system data may be codified and the codified data signal sent on to a carrier or baseband signal to be transmitted. This forms a spread spectrum signal in which the effective bandwidth of the data is considerably increased, thereby reducing sensitivity to interference because of the enhanced signal to noise gain.

A receiver including a matched filter may recover the spread spectrum signal. Recording of the recovered signal may only occur if the receiver internal reference code matches the code within the codified data signal. In addition, the phase of the internal code must be searched for, tracked and locked on to in order to maintain synchronism with the data signal code allowing receival to occur. It will be apparent that the effectiveness of this phase synchronisation, the searching therefor, tracking and locking thereto, in the presence of interference within the received spread spectrum signal reflects the effectiveness of the communications system, in particular under adverse transmission conditions.

SUMMARY OF THE INVENTION

It is an object of this invention to provide a line network communication system including improved code phase searching, tracking and locking techniques, between a receiver code and a received data signal code, thereby decreasing susceptibility to communication interference.

According to one aspect of the invention there is provided a line network communication system including a transmitter means capable of transmitting a series of coded data signals on a baseband carrier signal and receiver means capable of receiving a transmitted signal and recovering therefrom said coded data signals, the receiver being arranged to operate in a search mode to compare a series of received data signals with a series of coded reference signals at different relative phases until at least one comparison signal generated as a result of said comparisons indicates a degree of correlation exceeding a threshold value, a tracking mode to verify that said degree of correlation exists for a preset time interval and, in dependence on a successful verification in the tracking mode, a locking mode to maintain a selected phase difference between the compared series while said degree of correlation exists permitting recovery of the coded signals.

Preferably the receiver means comprises comparison means for comparing, in said search mode, a series of received data signals with a series of coded reference signals at a number of different relative phases thereby to generate a corresponding number of comparison signals forming a set, means capable of varying the relative phases of compared signals until at least one comparison signal in a set indicates a degree of correlation exceeding said threshold value, means capable of verifying, in said tracking mode, that having so varied the relative phases of compared signals at least one comparison signal in each of a plurality of different sets, generated by comparing a corresponding plurality of series of successively received signals with said series of coded reference signals, represents a degree of correlation exceeding said threshold value, and means for further varying, in a locking mode and in dependence on a successful verification in the tracking mode, the relative phases of the compared series so that the comparison signal in successive sets representing the maximum degree of correlation, occurs when the compared series have said selected phase difference.

In a preferred embodiment said series of coded data signals may comprise 1024 time slots of pseudo random or M-sequence code for each data bit.

According to another aspect of the invention there is provided a line network communication receiver comprising received transmission signal means capable of recovering said codified data signal, search means to test for correlation in phase between an internal receiver reference code and a code within said transmission signal, tracking means to examine for the presence of a preset level of correlation for a preset time, and locking means to maintain said phase and remaining sensitive to said level of correlation.

According to a further aspect of the invention said line network communication system includes receiver arrangements capable of re-transmitting received data, when said data includes a repeat number, the re-transmission of said data being repeated the repeat number of times and said re-transmitted data including a value of said repeat number, reduced in a known way.

BRIEF DESCRIPTION OF THE DRAWINGS

For a better understanding of the present invention and to show how the same may be carried into effect, reference will now be made by way of example only, to the accompanying drawings, in which.

DESCRIPTION OF THE PREFERRED EMBODIMENTS

Spread spectrum techniques involve codifying data of a particular bandwidth to produce a codified data signal having a considerably greater bandwidth. This signal may then be sent on to a carrier or baseband signal, for example at mains frequency, to form a spread spectrum signal. The codification provides a pattern that enables data recovery even when the spread spectrum signal is substantially submerged in noise.

Figure 1:
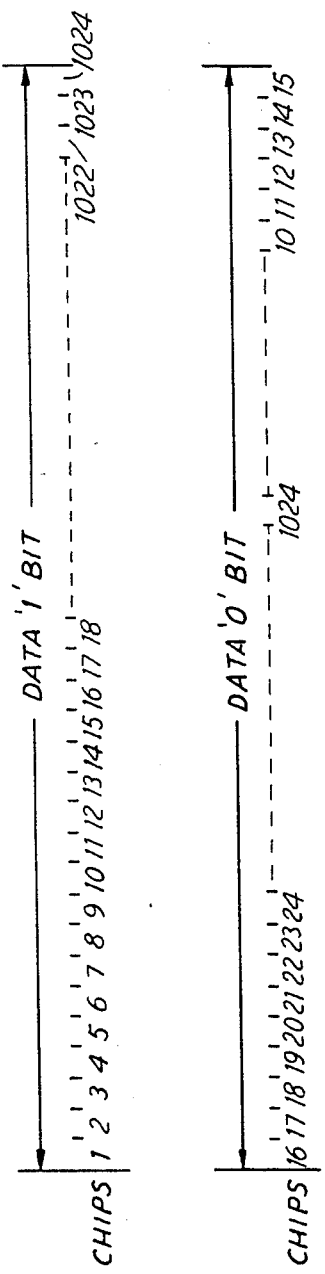
FIGS. 1a and 1b illustrate a code representation of data.

The data may be encoded in any suitable form, for example, pseudo random (M sequences) or sequential phase shift. In an example of the invention herein disclosed, a data bit may be represented by a sequence of 1024 time slots or chips of pseudo random code, each chip comprising a negative or positive pulse. Data 1 and data 0 may be represented by a phase shift of, for example, fifteen chips in the code sequence. FIG. 1(a) illustrates coded data bits and FIG. 1(b) portrays the coded data signal representation of a sequence of data bits—each identically numbered chip clearly having an identical pulse polarity. This signal may then be sent on to mains frequency to produce a spread spectrum signal. It will be apparent that differing codes and phase shift representations of data bits may be utilized as appropriate. Essentially the code sequence for data 1 and data 0 must have a degree of immunity to one another, for example distinct orthogonal maximal sequences may be used.

To receive the codified data, the coded data signal requires de-coding, necessitating access not only to the code but also to the phase of the code. A receiver in possession of the requisite code may compare its code with the received code, shifting the relative phase until the particular pattern of the received code matches the requisite code and correlation is achieved, allowing data transfer to occur. Clearly the receiver code may be shifted relative to the received code or the received code shifted relative to the receiver code.

Correlation may be examined conveniently over a data bit, that is to say 1024 chips. The received code chips may be compared directly with the chips of the receiver code comprising a series of coded reference signals by means of an exclusive OR gate, each correct correlation of a chip of the code producing a pulse from the gate, the number of these pulses being counted over a bit period forming thereby a comparison count Y. Perfect correlation would elicit a count of 1024 (perfect anticorrelation a count of 0). It will be appreciated by those skilled in the art that a count of 512 would be established on average by random correlation. A variance level given by a value of the modulus of (Y−512) that is above a predetermined threshold level will indicate whether a significant variation from random correlation has occurred and the threshold level may be chosen with a view to establishing a balance between false signals and omission of weak signals, thereby reducing interference problems.

Figure 2:
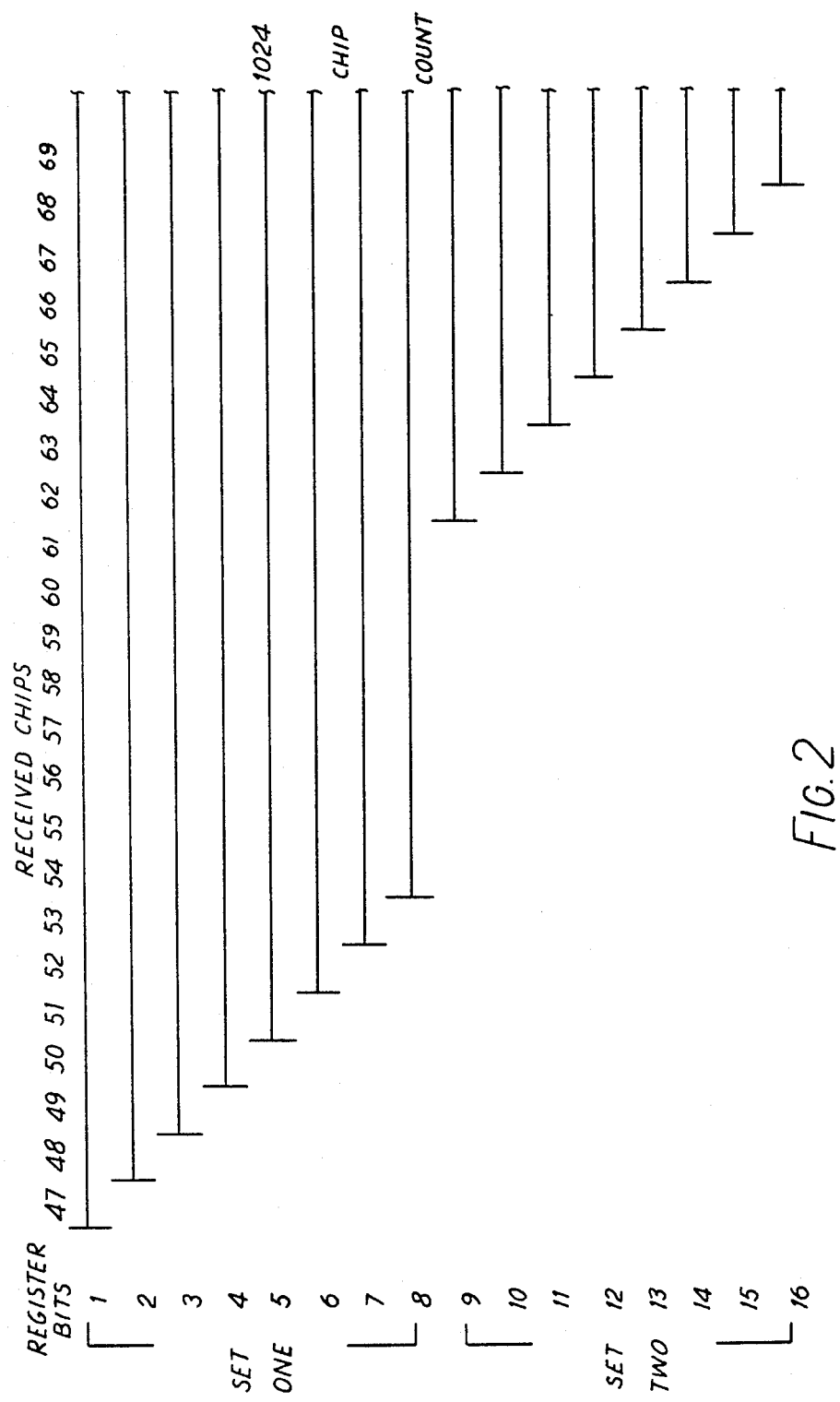
FIG. 2 illustrates the time sequence of correlation testing.

A rapid correlation search system may be developed by examining the comparison count of 1024 chips at a set of n points adjacent in chip time. For example, a first bin comprising a count over 1024 chips (i.e. a data bit) may be counted starting with chip X, a second bin count over 1024 chips starting at chip X+1 and at further chip positions making a set of n bins. This principle is illustrated in FIG. 2 with n equal to eight, a first eight bins at adjacent chips count and a second eight bins at adjacent chips, separated from the first eight by seven chips. Clearly other values of n may be chosen.

In the simplified case where adjacent sets of n points or bins are chosen with a data bit length having a code sequence of N chips, then N/n sets will be required to search for correlation across all N positions. If the chip frequency is f then it can be seen that a complete search of all correlation positions will require a time given by $$\frac{N}{n} \times \frac{N}{f} = \frac{N^2}{nf} \quad (1)$$

Therefore a search mode searching for a variance level above a pre-determined threshold may have more rapid searching as the value of n is increased. Clearly the circuitry in use will place an upper limit on n.

The count values within the sets of bins at adjacent eight chips may be examined for values of variance level exceeding the threshold level, thus indicating significant correlation. When no correlation is registered next sets of bins may be examined by either ignoring a number of incoming chips before a new comparison count occurs, or alternatively shifting the receiver code in chip time. This process effectively searches for correlation.

In the case illustrated in FIG. 2, when correlation is registered in one of the sets, either a data 1 or a data 0 will have been registered. As a result of the phase shift distinguishing data 1 and data 0 bits, namely a 15 chip difference, the following significant correlation count registered will also be dependent on the value of the data bits. For example, if a data 1 correlation was registered in set 2, then the next data bit will result in a correlation within this set only if it is also a data 1, since a data 0 would be delayed 15 chips with respect to the set. Alternatively, if a data 0 bit was registered in set 2, a data 0 as the following bit would also register in set 2. In the case of a data 1 bit following this data 0 bit, the data 1 correlation would appear in set 1 as a consequence of the phase shift between data 1 and data 0. It will be apparent that the disappearance of the correlation as a consequence of this phase shift may be rectified by shifting the relative positions of the receiver code and the codified data by ±16 chips according to the set previously registering correlation.

Figure 5:
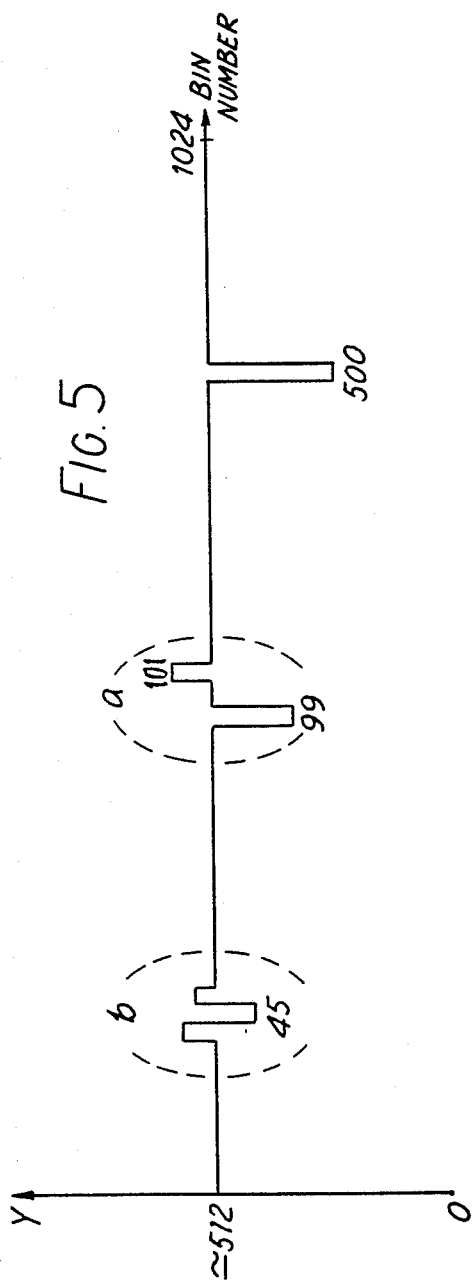
FIG. 5 illustrates correlation levels for N bins.

In a preferred searching embodiment N bits are examined by searching the N/n sets and a correlation table of the variance values in the N bits can be established with the highest value of Y−512 in a bin above the threshold occupying the top location. The search table is updated and shuffled during search and the table length Z may be chosen as required. Clearly then a list of the bin number against value of modulus of Y−512 can be graphically illustrated as in FIG. 5. In this figure the correlation values are centred around bin 45, bin 100 and bin 500. As a received signal can have side lobe correlation and random noise can produce large correlation values above the variance threshold level it is important to ensure that a tracking mechanism tracks the previous correlation values produced by the signal. By utilization of an updated priority table tracking would occur at bin 500 initially, but in the following monitoring of this bin the correlation would not occur at the identical bin number since it was noise inspired. By examination in the tracking mode of the correlation for a number V data bit periods a break-down level can be established. Clearly the combined correlation within a window of w bins may be examined.

Figure 6:
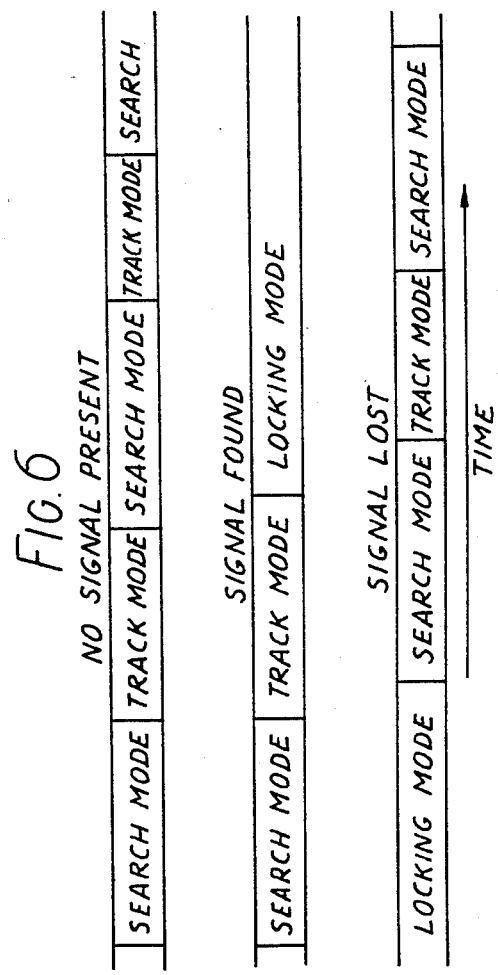
FIG. 6 illustrates alternative system modes with respect to signal detection.

Thereafter, if correlation fails, the next table position can be examined and indeed the position (b) centred on bin 100 would be locked onto a side-lobe (a) centred on bin 45 would be missed. If no correlation is found within any of the Z table positions a new search scan can begin. This is illustrated in FIG. 6.

Clearly this mode of tracking can be applied to the rapid correlation search system described hereinabove and in this case the number of bins in said window is n.

Therefore this arrangement of searching mode and tracking mode allows code correlation to be tested, searched for, and subsequently tracked when located. Indeed, the correlation may be locked on to by adjusting the relative positions of the receiver code and received code such that the maximum level exceeding the variance level for data 1's and data 0's is located at the central positions in the w bins in the tracking mode and maintaining a sensitivity to correlation levels.

Utilization of this procedure of searching, tracking and locking allows effective communication over a line network, which communication has a reduced susceptibility to interference problems. Further aspects of the procedure actually involved shall become clear hereinafter.

Figure 3:
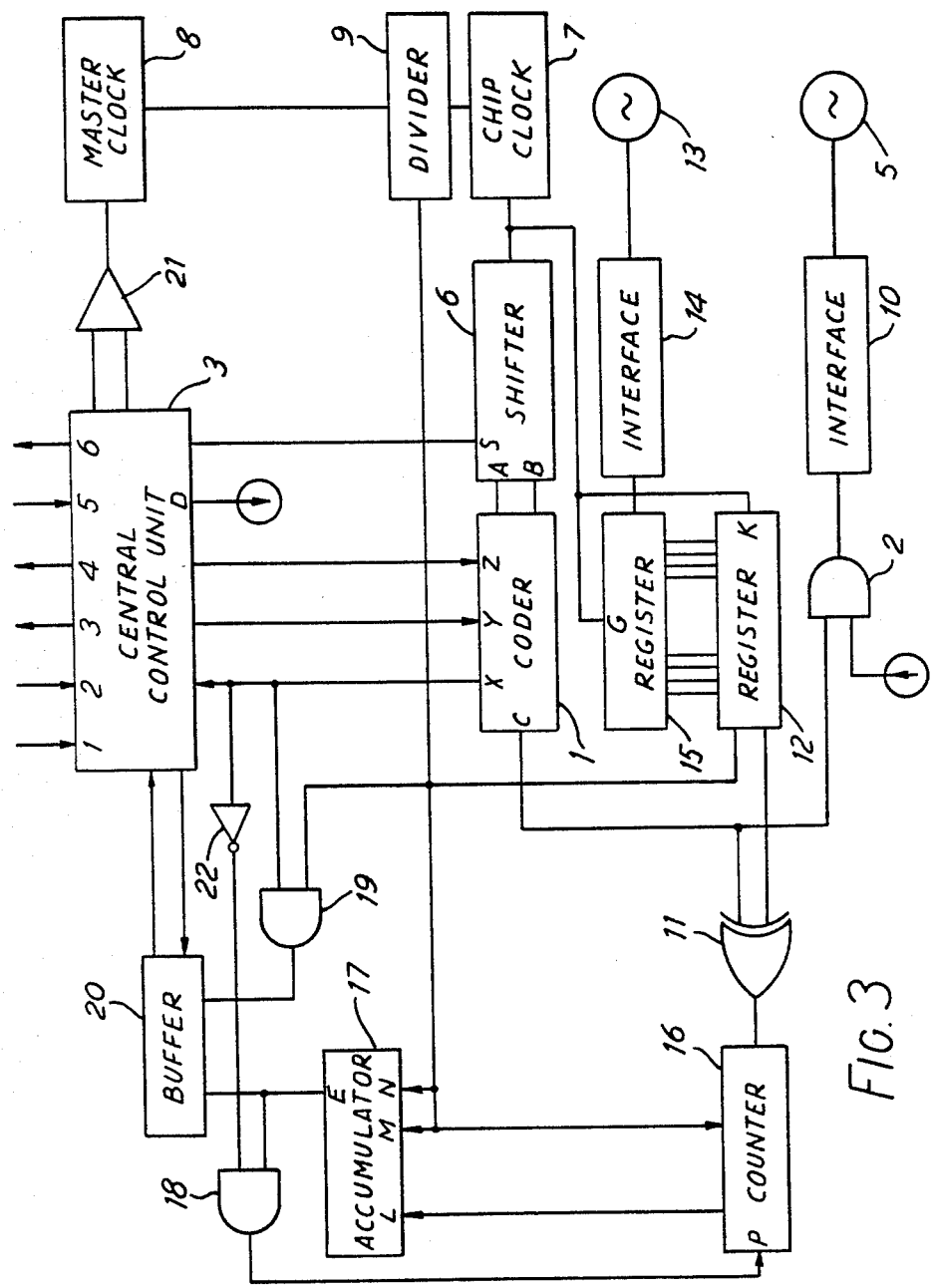
FIG. 3 illustrates schematically a circuit for a transmitter and receiver unit wherein received code is compared with a receiver code chip.

A circuit diagram of a transmitter and receiver unit wherein the received code is compared with a receiver code and the unit is capable of having a search, tracking and locking mode is illustrated in FIG. 3.

Data transmission is initiated initially by setting an input 5 of a central control unit 3 to a transmit mode. In response, an output D of unit 3, linked to an AND gate 2, becomes high, enabling the gate. Similarly, an output 6 of the unit 3, connected to for example, a display panel (not shown), causes the panel to indicate a transmit mode is in operation.

Transmission data is passed to an input 1 of the unit 3, before relay to either input Y or input Z of a code generator 1, the input selected being dependent on whether the data bit is a "1" or a "0". Input 2 of unit 3 receives clock pulses indicative of the transmission data input rate. When either of the above inputs of coder 1 becomes high, 1024 chips of the characteristic code of the transmitter are relayed from an output C of the coder, in response to chip clock pulses, through the enabled AND gate 2 to a mains interface 10, where the coded data signal is added on to mains frequency and transmitted down a mains line 5. The particular status of inputs Y and Z determines which code is generated, that is to say a shift of 15 chips is produced for a data "0" code, as disclosed hereinabove. Chip clock pulses originate from a master clock 8 before passage through a divider 9 to a chip clock 7. Pulses from the chip clock are passed to a shifter 6, an output A of which relays these pulses directly to the coder 1. The function of shifter 6 will become apparent hereinafter.

Therefore in the transmit mode, data enters the control unit 3, is codified in the appropriate manner by the coder 1 into a sequence of 1024 chips, emitted at the chip clock pulse rate, the sequence being sent on to mains frequency in a suitable form and transmitted down mains line 5.

In a receive mode, input 5 of control unit 3 is set to place the circuit in a suitable receiving state, an indication of this being an alteration of output 6 of unit 3, which output may be connected for example to a display panel. In the receiving state, the relevant input Y or Z of the coder 1 is adjusted to produce continuous generation of the data "1" code from output C of the coder. It will be apparent that this code now acts as the receiver code.

A mains line 13, which may form part of mains line 5, is connected to a mains interface 14, wherein any codified data signal present in a spread spectrum signal travelling on the mains line 13, is recovered from it. The codified data signal is relayed from the interface 14 to a 23 bit shift register 15 connected in parallel with a 16 bit shift register 12. The first and last eight register bits of register 15 forming the parallel connections. Therefore, the coded data signal channels through the register 15, being shifted through one register bit in response to chip clock pulses from chip clock 7 received at an input G of the register. Clearly, synchronous rate of code generation will be required in transmission and receiving arrangements, that is to say, substantially identical chip rates.

Immediately following a single register bit shift in the register 15, the same chip clock pulse is received at an input K of the register 12 causing the parallel contents of register 15 to be transferred, thereby effectively monitoring two sets of eight consecutive data chips, separated by seven data chips. It will be apparent that comparison of each register bit in register 12 with the current chip of the code from output C of coder 1 and summation of these comparisons for 1024 chip periods produces the measure of correlation referred to hereinbefore. To effect this situation, the contents of the 16 bit register 12 are transferred out, in order, to response to pulses from divider 9, which pulses occur at 16 times the chip clock rate. The first register bit is transferred to an exclusive OR gate 11 which compares the register bit with the code chip from output C of coder 1. The product is relayed to a counter 16 where it is added to the value appearing at input P thereof, before transfer to an input of a 16 word accumulator 17, the accumulator contains 16 words of 10 bits for the summated totals. The sequence of events in the counter occur in response to pulses received at an input R thereof, which input is connected to divider 9. Subsequent divider pulses transfers all the 16 bit contents of register 12 through the comparison with a chip code in exclusive OR gate 11, on to accmulator 17 wherein the comparison results are stored as sixteen 10 bits words under the control of divider pulses received at an input M thereof.

At the end of 16 divider pulses, after the above transfer, a chip clock pulse arrives at register 15 to shift a further data chip through the register. Thereafter, the same clock pulse arrives at register 12 to cause transfer of the shifted parallel contents of register 15, which contents have now been shifted by one register bit. The transfer for comparison with the chip code occurs as disclosed hereinabove, the comparison clearly being with the next chip of the chip code produced from output C of coder 1 since a complete chip period has passed since the previous comparison. To accumulate or sum the comparisons, the word contents of the accumulator 17 are relayed from an output E, in sequence and in response to respective divider pulses at an input N thereof, through a normally open AND gate 18 to the input P of counter 16 referred to hereinabove, where the accumulator contents are added to the new comparison result for the corresponding register bit, relayed from gate 11. In this manner 1024 comparison results may be summated within accumulator 17 for two sets of eight bins separated in chip time by seven chips. This can be recognised as forming set 1 and set 2 illustrated in FIG. 2.

When the 1024 chips of a data bit have been emitted from coder 1 an end of sequence pulse causes an output X of the coder 1 to become high for one chip period. This output is connected, firstly to the central control unit 3 and the high state initiates a correlation tracking test sequence described hereinbelow, and secondly to an AND gate 19 also receiving divider pulses. The high state of output X of coder 1 enables gate 19 and the divider pulses may pass through to a 16 word buffer accumulator 20. The output E of accumulator 17 is also connected to buffer 20 and the reception of divider pulses at the buffer allows this accumulator output to enter the buffer. The summation of these particular accumulator contents with the next counter 16 comparison results is prevented by connecting the output X of coder 1 through an inverter 22 to an input of the normally open AND gate 18. Clearly the high state of output X effectively inhibits AND gate 18. After one chip period the output X of coder 1 returns to its normal low state and the accumulation of correlation results for the next data bit period can continue, whilst the previous data bit summation of the correlation results, are stored in buffer 20.

The summation results may then be examined by allowing the central control unit to have access to the buffer contents via output links, the results being examined within a data bit period by the control unit for correlation values Y different from random by greater than a predetermined threshold variance level in which case a tracking mode is entered. The procedure of examining results being initiated by the high state of output X of coder 1.

In operation recovered coded data signals enter the transmitting and receiving unit. The control unit acts in a search mode and for a first data bit period correlation values are summated and buffer 20 contents examined for correlation as hereinabove described. If no correlation is formed the central control unit acts on an input S of shifter 6 to cause shifter 6 to operate, through an output B, on the stored code sequence in coder 1 such that the next complete data code sequence starts from a code chip 8 chips delayed from the previous sequence. When no correlation is observed by the control unit in the buffer results of the next data bit period, shifter 6 is acted on by the control unit to produce a delay in the data code sequence from the coder of 23 chips. This delay of 23 and 8 chips continues in alternation so long as the control unit is in a receive mode and the correlation threshold variance level is not exceeded, continuing therefore the search mode. In this manner the code sequence of the receiver is shifted relative to the code sequence of a received signal, thereby effectively searching for correlation in a rapid manner.

When the threshold variance level is exceeded searching for correlation is halted and as described hereinbefore the tracking mode is entered and the following data bit period is examined. Clearly in this case no table of correlation values is formed and the tracking mode is only entered when one particular value of correlation in either set causes the threshold variance level to be exceeded. It will be appreciated however that a data bit period delay exists between examining for subsequent correlation in the tracking mode and shifting the relative positions in time of the received signal code and the receiver code. This delay may however be compensated for by the control unit. The set in which correlation occurs decides subsequent action as described hereinbefore. It should be noted that in this embodiment where more than one buffer word has a correlation exceeding the threshold variance level within a set, the maximum variance from random is taken, if the level should be the same in different sets, set 1 is chosen as the data bit set.

Before entering a locking mode, the control unit in the tracking mode monitors consecutive bits without searching and waits until a preset number of consecutive correlated bits are received, for example eight, otherwise the search mode is initiated again. When the tracking mode has found the preset number of correlated bits, the control unit 3 enters a locking mode wherein it causes shifter unit 6 to act on coder 1 to shift the relative positions of the data code sequence and receiver code sequence such that the correlation resulting in a maximum level of variance occupies one of the two central locations of the set. The control unit also examines the degree to which the maximum variance level occurs within a bin location and by alteration of a clock control 21 the master clock frequency can be adjusted to centre this maximum within a bin location.

Finally, the number of times this threshold variance level is exceeded in a preset time period is monitored by the control unit and when the number falls below a signal lost threshold number the search mode is re-entered. By this means the signal end is monitored and also the effects of bursts of interference can to some extent be alleviated.

Figure 4:
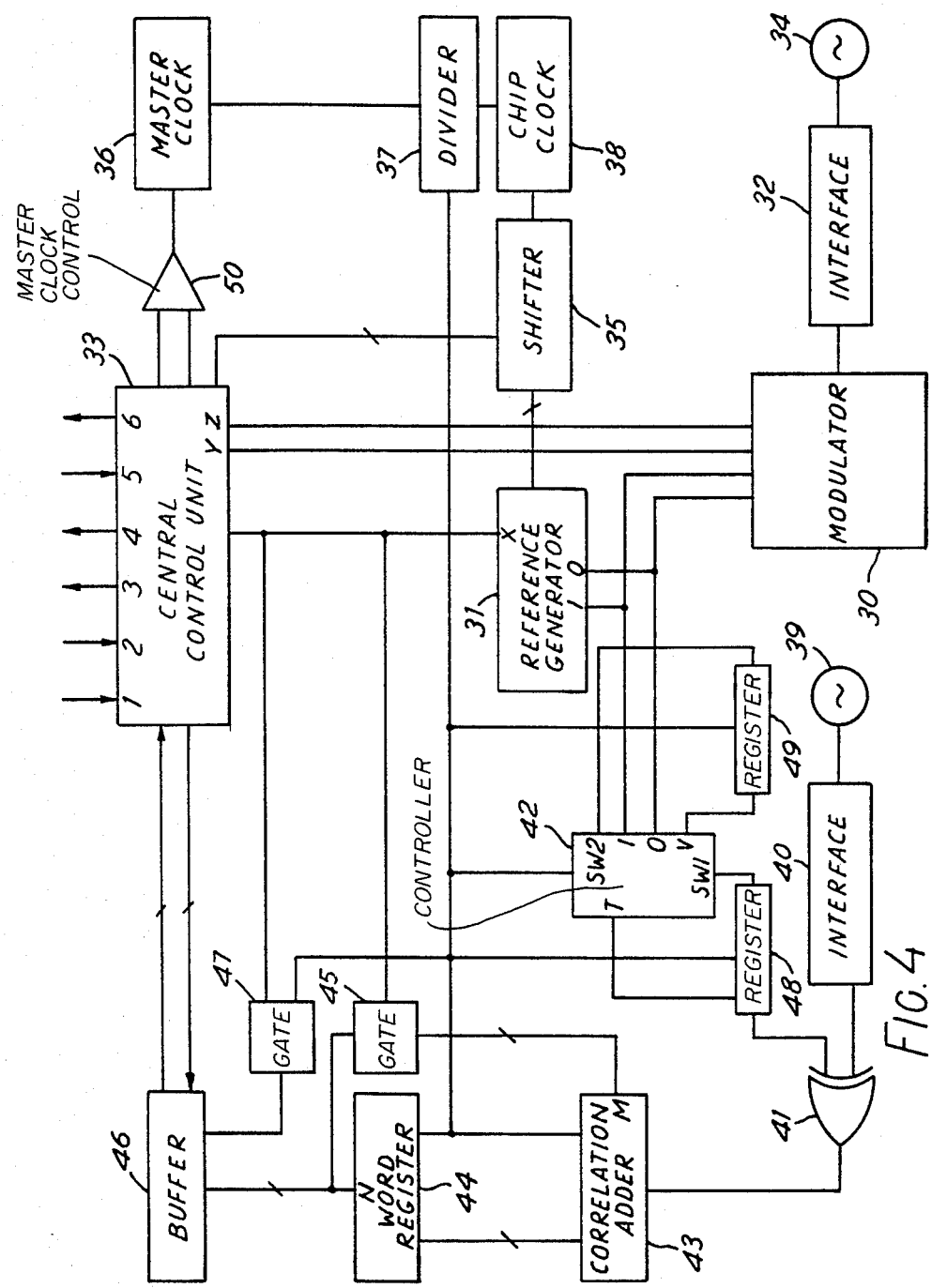
FIG. 4 illustrates schematically a circuit for a transmitter and receiver unit wherein receiver chip code is compared with a received code chip.

The embodiment of the invention described hereinabove can be improved by incorporating the aforementioned search table and by examining the contents thereof during a tracking mode. Furthermore, although the above described embodiment utlizes comparison of a number of received code chips with a single receiver reference code chip, the invention is not limited thereto. Indeed FIG. 4 illustrates an embodiment wherein a single received code chip is compared with a number of receiver reference code chips. In addition, the receiver reference code for a data bit 1, and a data bit 0 are produced simultaneously from an addressed memory device, permitting simpler utilization of complex codes, and phase shifting of the data bit code by alteration of the addressing of said device.

Referring to FIG. 4, a central control unit 33 of a transmitting and receiving arrangement is put into a transmit mode by suitable adjustment of an input 5 of the unit. Transmission data and the requisite clock data are then relayed to respective inputs 1 and 2 of the unit. An output 6 of the unit may suitably activate a display panel (not shown) to indicate a transmission mode.

A reference code generator 31 continually releases the receiver reference code for a data 1 and a data 0 from respective outputs 1 and 0. The generation of the code, which is contained in the addressed generator memory, occurs in response to addressing by shifter device 35. This device shifts the address by one on receipt of chip clock pulses from a chip clock 38 driven by pulses from a master clock 36 and relayed through a divider 37. The starting address of the 1024 chip reference code is decided by the central control unit 33. The reference code for data 1 and data 0 bits is relayed from outputs 1 and 0 of the generator 31 to a modulator 30, which passes either code on to an interface unit 32 in dependence on the status of outputs Y and Z of unit 33 to which the modulator is linked. Clearly the status of output Y and Z will reflect the binary identity of the data to be transmitted. Consequently data to be transmitted and clock information is relayed to respective inputs 1 and 2 of unit 33, is encoded within modulator 30, passed to interface 32 where the coded data signal is sent on to a mains line 34 in a suitable form. It should be noted that higher frequencies in the transmitted signal can be emphasised by suitable means on transmission and de-emphasised on reception.

For an arrangement in a receive mode, the input 5 of the central control unit is adjusted accordingly and output 6 thereof may suitably activate the display panel (not shown) to indicate a receive mode.

A mains line 39, which may form part of mains line 34, is connected to an interface 40, wherein any coded data signal present in a spread spectrum signal passing along mains line 39, can be recovered from it. The coded data signal will appear at a chip rate substantially the same as the pulses from chip clock 38 and the coded data chips are relayed to an exclusive OR gate 41 for comparison with receiver reference code chips.

In this embodiment it is required to examine sets of comparison counts of 1024 consecutive chips at eight adjacent chip positions, that is to say, a set of eight bins. The set of eight bins at adjacent chip positions are to be positions in the receiver reference code, which will be compared at each comparison with a single received chip.

To effect this by means of a search mode, output 1 and output 0 of reference generator 31, running at the chip clock rate, are connected to respective inputs 1 and 0 of a flow controller 42. Code for a data bit 0 is relayed from input 0 through a switch SW1 to the last bit of an 8 bit shift register 48, thereby filling it with eight data 0 code chip values represented by A, B, C . . . H, the first register bit position being A. Similarly code for a data bit 1 is relayed from input 1 through a switch SW2 to the last bit of an 8 bit shift register 49, thereby filling it with eight data 1 code chip values represented by A', B', C'. . . H', the first register bit position being A'.

Divider 37 is arranged to run at sixteen times the chip clock rate, and can feed divider pulses to each register 48 and 49 slightly after a divider pulse reaches flow controller 42. When a first divider pulse reaches the controller, it is counted and also switch SW1 operates to connect the last bit of register 48 instead to an input V of the controller, which input is connected to the first bit of register 49. Also switch SW2 operates to connect the last bit of register 49 instead to an input T of the controller, which input is connected to the second bit of register 48. Reception of the first divider pulse at registers 48 and 49 causes a single shift therein. Consequently chip A is shifted out to gate 41, chip B having the second register bit position of register 48 is shifted to the first position and through switch SW2 into the last bit position of register 49, which is vacant as a consequence of chip A' having been shifted along through switch SW1 into the last bit position of register 48. Consequently chip values B to H and A' to H' remain within registers 48 or 49. Chip B is now occupying 2 register bit positions temporarily.

Chip A, shifted to gate 41 will be compared with the received chip fed from interface 40. The comparison result from gate 41 is relayed to a correlation adder 43, which adds the result to a result appearing at an input M thereof. In response to a second divider pulse the adder relays the contents through to a first 10 bit word position in a sixteen word 10 bit register 44. The same second divider pulse also causes register 44 to produce at its output N the contents of its second 10 bit word position, which contents are relayed through a gate 45 to the input M of adder 43.

Furthermore, the same second divider pulse is counted by controller 42 and received by register 48 and 49, further rotating their contents about the ring formed by the closure of switches SW1 and SW2 as well as shifting chip B to gate 41. The same comparison of chip B is made with the same received chip, as for chip A and the result of the comparison added to the prior contents of the second word position of register 44 before being returned there. Further divider pulses shift out further chips.

With the reception of a sixteenth divider pulse by controller 42, switches SW1 and SW2, reconnect with respective inputs 0 and 1 for this pulse only and the counter in the controller is reset. When the same sixteenth divider pulse is received by registers 48 and 49, the chip in the first bit position of register 48, being chip H' is shifted to gate 41 to complete the second set of eight bin comparisons. The chip to replace the vacancy occurring in the last bit position of this register is now drawn from input 0 of controller 42 as a result of the change in connection of switch SW1. This chip will in fact be the following chip in the data '0' code, chip I, since within the sixteen divider pulses a further chip clock pulse received by shifter 35 will advance by one the address referenced in generator 31.

It follows that the chip in the first bit position of register 49 will be lost due to the switch SW1 connection to input 0 within controller 42 and similarly the vacancy in the last bit position of this register will be filled by the following chip in the data '1' code, chip I', as a consequence of switch SW2 being connected to input 1 within the controller.

It will be apparent therefore that all eight chips of each register 48 and 49 will be passed to gate 41 for comparison with the single received code chip from interface 40 and the chip in the first bit position of each register will not remain in the registers and will be replaced in the last bit position by the following chip in the respective data 0 and data 1 reference code. The above procedure is clearly repeated for following divider pulses, comparing with a new received chip each 16 divider pulses.

Therefore within a chip clock pulse period or sixteen divider pulses, eight adjacent bits of each data reference code are compared with a single received code chip and the result accumulated with previous results. This effectively forms two sets of eight bins and after 1024 comparisons, that is to say a complete reference code for a data 0 and data 1, output X of reference generator 31 becomes high for a single chip period. This output is firstly connected to control unit 33 to initiate a procedure outlined below. Secondly, it is connected to gate 45 where the high state disables the gate, effectively producing zero values for all sixteen 10 bit words presented at input M of adder 43, and thereby starts a new 1024 chip comparison count. The actual contents of register 44 for this chip period are read out into a buffer 46, which is enabled for this period as a consequence of divider pulses passing through a gate 47 enabled for one chip period as a consequence of a connection to the output X of generator 31, which has a high value.

Central control unit 33, when initiated by output X of generator 31, may examine the new contents of buffer 46, noting comparison counts having a variance level greater than a predetermined threshold level and correlating this with the previous address status of shifter 35. During a complete search of 1024 data '1' comparison counts (bins) and 1024 data '0' comparison counts (bins) placed in buffer 46, the control unit orders the variance levels above threshold in order of greatest magnitude in a table of preset length Z and after the complete search, tracking mode may be entered. In this mode the first position in the table may be re-examined for correlation by returning to the relevant address and the contents of a window of width w is centred on the relevant address may be tested for window correlation above a window threshold level. In this case w equals eight. If this level is not exceeded, say twice within ten data bit scans then the next position in the table is re-examined until, at most all Z positions are scanned and the search mode is re-entered. However, if tracking is successful, then it will be apparent that data 1 and data 0 can be distinguished.

After successful tracking, a locking mode is entered wherein the maximum variance level is centred around the central bin of the window having width w, by alteration of address applied to shifter 35. Furthermore, if deviation occurs between the chip clock 38 and the chip rate of received data code, control unit 33 may act on a master clock control 50, which can alter the frequency of master clock 36, thereby ensuring synchronous receiver reference code chip rate and received code chip rate. The received data and clock information is relayed from respective outputs 3 and 4 of the control unit 33.

Consequently there is a phase locked loop between receiver and received code sequences. It is important that the locking mode still monitors window correlation level, in order that a preset rate of levels below the window threshold level returns the receiver to its search mode, as in the case when the received signal ends, but also in order to reduce effects of bursts of noise.

It will be understood that the criterion for searching, tracking and locking modes, for example the time constants for investigating various operations of the circuit, may be chosen as required dependent on communication conditions, error tolerance levels, and circuit capability. Under conditions of extreme interference the communication network may utilize an array of transmitter-receivers described hereinabove, each arranged to re-transmit a received message a repeat number of times dependent on repeat information within the passage. Clearly, the retransmitted message must also contain the repeat information and have a repeat number less than the received repeat number.

The details of the central control unit, shifter-coder arrangement and shifter, referred to in the above embodiments will be apparent to those skilled in the art and the chip clock rate can be selected as required, for example 200 KHz.

In addition it will be understood that the embodiment illustrated shows an application of the invention in forms for the purpose of illustration only. In practice the invention may be applied to many other different configurations, the detailed embodiments being straightforward for those skilled in the art to implement.

What is claimed is:

1. A line network communication system including transmitter means capable of transmitting a series of coded data signals on a base band carrier signal and receiver means capable of receiving a transmitted signal and recovery therefrom said coded data signals wherein said receiver means comprises comparison means for comparing, in a search mode, successively received data signals with a series of coded reference signals at a number of different relative phases thereby to generate a corresponding number of comparison signals forming a set and means capable of changing the relative phases of the compared signals until at least one comparison signal in a set indicates a degree of correlation exceeding a threshold value, means for verifying, in a tracking mode, that having so changed the relative phases of compared signals at least one comparison in each of a plurality of different sets, generated by comparing a corresponding plurality of series of successively received data signals with said series of coded reference signals, represents a degree of correlation exceeding said threshold value and, in dependence on a successful verification in the tracking mode, means for adjusting, in a locking mode, the relative phases of the compared signals so as to maintain a degree of correlation in excess of said threshold value thereby to permit recovery of the coded data signals.

2. A line network communication receiver comprising receiver means as used in a line network communication system according to claim 1.

3. A line network communication system according to claim 1 wherein said comparison means comprises means for generating, at a fixed rate, successive signals in said series of coded reference signals, means for advancing, at said fixed rate, received data signals through a first storage means, second storage means for receiving selected ones of signals prevailing in the first storage means, means for comparing, in turn, the signals in said second storage means, with a respective coded reference signal and means for combining the results of said comparisons so as to generate said corresponding number of comparison signals.

4. A line network communication system according to claim 1 including means capable of influencing generation of said series of coded reference signals to change, by an adjustable amount, the relative phases of said series of coded reference signals and received data signals.

5. A line network communication system according to claim 1 wherein the comparison means comprises storage means arranged to receive at respective storage locations a number, equal to said corresponding number, of reference signals, means for varying periodically, in accordance with a cyclical operation, the positions of said reference signals in the storage means, means for comparing each reference signal, in turn, as the position of the reference signals are varied, with a data signal, and means for generating each said comparison signal in dependence on comparisons of a respective reference signal with successively received data signals forming said series.

6. A line network communication system according to claim 1 including means capable of monitoring, in the locking mode, the number of times within a preset time interval the comparison signal indicates a degree of correlation exceeding said threshold value, and means for causing said receiver means to operate in the search mode if said number of times is below a predetermined value.

7. A line network communication system according to claim 1 arranged to retransmit received data in dependence on the presence of a repeat instruction in the recovered data signals.

* * * * *